Patented Oct. 3, 1950

2,524,107

UNITED STATES PATENT OFFICE 2,524,107

ALKYL SUBSTITUTED PIPERONYL CYCLOHEXENONES

Oscar Fred Hedenburg, Pittsburgh, Pa., assignor to Harold W. Moburg, trustee, Toledo, Ohio No Drawing. Application July 18, 1946, Serial No. 684,545

9 Claims. (Cl. 260—338)

This invention relates to improvements in insecticides, and includes the production of new organic chemical compounds having valuable insecticidal and synergistic properties, as well as compositions containing the same. The invention includes a new process for producing such chemical compounds, as well as new chemical compounds produced thereby, and insecticidal compositions containing such compounds.

The economic control of insects is an extremely broad field, dealing as it does with the enormous variety of insects which injure foliage and growing plants either directly, or indirectly by the transmission of injurious plant diseases; with the considerable number of insects which constitute a grave danger to human and animal life by their ability to transmit diseases; and with those other insects which are sufficiently injurious or annoying to human beings and animals to be of economic consequence. The attempted control of all these insects under the wide varieties of conditions which are encountered in that control requires the use of a great many insecticide materials and a wide variety of technique in the preparation of these materials into finished insecticides and their application.

All the insecticides and insecticide materials have their limitations. No universal insecticide has been, or is likely to be, discovered. All materials in common use are limited to a degree by specificity. They may be very effective against certain types and varieties of insects and completely ineffective against others. Many materials in common use such as, for example, lead arsenate, nicotine, thiocyanates, etc., are limited to a greater or less degree by their toxicity to warm-blooded animals, including man, or by their injury to plant tissue under certain conditions, or by other objectionable or undesirable characteristics. In particular, a limitation has been imposed on the use of many otherwise useable insecticides through the fact that they leave poisonous residues on fruits and vegetables which prevent their use in food unless they can be removed before marketing, which is not always the case. Limitations in other instances are imposed by the fact that certain valuable insecticides are stomach poisons only and, therefore, kill only such insects as eat foliage or other media on which the insecticides are applied. Many of the economically important insects attack plant life by sucking the plant juices, and, accordingly, are immune or practically so to the so-called stomach poison insecticides. Also, in many cases, limitations on the use of individual insecticide materials are imposed by their physical characteristics which make them unavailable for certain types of application. For instance, the most generally used materials for the control of household insect tests are oil sprays in which the insecticidal materials are incorporated into a suitable grade of mineral oil. Obviously, insecticides which cannot be dissolved in mineral oil, either directly or by the use of secondary solvents, are unavailable for this particular purpose.

As indicated in the foregoing, many inherently toxic insecticide materials are utilized effectively and on a broad scale under circumstances which permit their use with suitable precautions in spite of their toxicity. In addition, there are a very large number of chemical substances of natural origin or artificially prepared which are recognized as insecticides in the sense that they are fatal to insects but which are sufficiently toxic to warm blooded animals or to plant tissue, or both, or are so irritating or otherwise objectionable as to render their use impossible or impractical.

Notwithstanding these recognized difficulties and limitations on known insecticide materials, it is recognized that the most desirable materials are those which combine effectiveness against wide varieties of insects with the greatest possible degree of safety to animals and plants. The ideal insecticide would be one fatal to all types of insects and completely non-toxic to man and animals. While this ideal probably can never be reached, the major objective of research in the insecticide field is to attempt to approach it as closely as possible.

Out of all the insecticide materials in use, the one which approaches more nearly to this ideal is pyrethrum flowers—or, rather, the active insecticidal principle, pyrethrins, which appear in the pyrethrum flowers. Pyrethrins are immediately toxic to a very great number of insect pests at different concentrations varying with the resistance of the insects mentioned. Also they are substantially non-toxic to animals and plants.

The so-called rotenone-bearing plants, derris, cube, etc. approach pyrethrum in this respect. Here the active principles consist of rotenone and numerous and not completely identified chemical bodies closely related to rotenone and associated with it in these plants. Both the ground roots of these plants and the extracts made from them are widely used in the preparation of insecticides. While their toxicity to warm-blooded animals, particularly when introduced directly into the blood-stream is recognized, it is not such as to preclude or seriously limit the widespread use in insecticides. In particular, rotenone insecticides may be used on edible plants and fruits without danger of leaving any poisonous residue.

The endeavor to extend the usefulness of these insecticides by increasing their effectiveness and lowering their cost has led to extensive research on another class of insecticide materials customarily referred to as synergists. As the word synergists is generally understood, such may or may not have appreciable insecticidal value when used by themselves, but when used in combination with suitable quantities of some other insecticidal substance such as pyrethrins, rotenone, etc., the resultant insecticide has an effectiveness appreciably greater than would be calculated from the sum total of its constituents. It may be said that synergism or synergistic action has occurred when the above condition is met.

The mechanism of synergism is by no means understood on the basis of present knowledge. It is not only possible, but probable, that it differs in the case of different synergistic combinations.

The application of synergists in the problems connected with pyrethrum insecticides has received particular attention both because of the recognizably unique value of pyrethrins and because their relatively high cost has encouraged study of methods to extend their usefulness and reduce the cost of insecticides made from them. Many substances have been found possessing more or less synergistic value when used with pyrethrins, but these known synergists are, so far as I am aware, deficient in two important respects. First, while their use does extend the killing power of the pyrethrins and permits effective insecticides to be made having lower pyrethrin content than would otherwise be the case, it is still necessary that the pyrethrin content be substantially high. Secondly, these synergists have displayed marked specificity in that while they may increase the killing power of pyrethrins against some varieties of insects to a marked extent, they have been found to be relatively ineffective in the case of other and more numerous varieties of insects.

The present invention provides new organic chemicals which have marked advantages as insecticides and synergists. They are substantially non-toxic and non-injurious to both animals and plants, at least to an extent which permits their practically unrestricted use. Moreover, their synergistic effects with pyrethrin are so marked as to permit the pyrethrin content of a given insecticide to be reduced to a relatively small percentage, in some cases by as much as 95%, without loss of efficiency, and in some instances with a considerable gain in efficiency. They are also markedly superior in their freedom from specificity.

The new organic chemicals contain the piperonyl group and an alkyl substituted cyclo-hexenone ring united thereto, and have the general formula $$R_1-R_2-R_3$$

in which $R_1$ is the piperonyl or methylene dioxyphenyl group

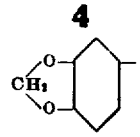

$R_2$ is a cyclo-hexenone ring, and $R_3$ is an alkyl substituent on the cyclo-hexenone ring containing two or more carbon atoms.

These new chemical compounds may be considered to have the following general formula:

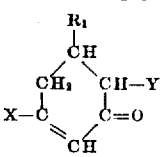

in which $R_1$ is the piperonyl group, X is an alkyl group containing two or more carbon atoms, and Y is hydrogen or an ester (COOR) group.

The improved process of the invention which results in the production of the new compounds is one in which a ketonic compound containing the piperonyl group and having the general formula

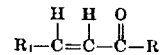

in which $R_1$ is piperonyl and R is alkyl, is reacted with an aceto-acetic ester, such as ethylacetoacetate, in approximately molecular proportions with the aid of a condensing and cyclicizing agent or catalyst to bring about combination of the aceto-acetic acid ester with the ketonic compound and form the alkyl substituted cyclo-hexenone ring joined to the piperonyl group.

The ketonic compounds which are used for reaction with the aceto-acetic ester can be prepared by reacting piperonyl with a methyl alkyl ketone containing two or more atoms in the alkyl group in the presence of caustic soda or other alkaline materials.

A particularly valuable insecticide and synergist is produced when piperonal is first reacted with methyl-hexyl-ketone to form 3,4 methylenedioxy-styryl-hexyl ketone (piperonal-methylhexyl-ketone), and this product is then reacted with ethyl acetoacetate to form a piperonal cyclohexenone having a hexyl substituent on the cyclohexenone ring.

Various methyl alkyl ketones can be used for reaction with piperonal to form other ketonic compounds which are then further reacted with the aceto-acetic ester. Among such ketones are included methyl-ethyl ketone, methyl-propyl ketone, methyl-butyl ketone, methyl-amyl ketone, methyl-hexyl ketone, and also higher ketones such as methyl-octyl ketone, methyl-nonyl ketone, methyl-undecyl ketone, methyl-octenyl ketone, etc.

Various aceto-acetic esters can be used for reacting with the intermediate ketones, including ethyl-, n-butyl-, n-hexyl-, n-butoxyethyl- and cyclohexyl-aceto acetates, etc, giving the corresponding products substituted in the cyclo-hexenone ring by the ethyl, n-butyl, n-hexyl, n-butoxyethyl and cyclohexyl groups.

The invention will be further illustrated by the following specific examples, but it will be understood that the invention is not limited thereto.

*Example I*

When piperonal and methyl hexyl ketone are reacted at low temperature in the presence of caustic soda, or other alkaline materials, there is formed a new compound, 3,4 methylene-dioxy-styryl-hexyl-ketone, according to the reaction

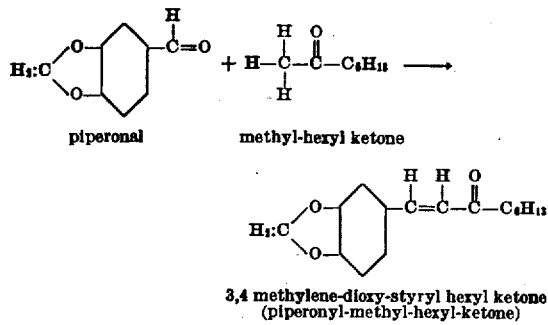

piperonal     methyl-hexyl ketone 3,4 methylene-dioxy-styryl hexyl ketone
(piperonyl-methyl-hexyl-ketone)

This compound has important synergistic properties. However, in accordance with the present invention, a still more valuable compound for this purpose is obtained by reacting this compound, 3,4 methylene-dioxy-styryl-hexyl-ketone, or piper onyl methyl-hexyl ketone, (No. 267) with ethyl acetoacetate, the reaction mixture being cyclicized to a cyclohexenone ring by sodium ethylate, sodium hydroxide, potassium hydroxide, calcium oxide, calcium hydroxide, barium oxide, or trimethyl benzyl ammonium hydroxide, or other cyclicizing catalyst, yielding a mixture of 1-3,4 methylene- dioxyphenyl-5-n-hexyl-cyclohexenone-3-Δ4,5 and 1-3,4 methylene-dioxyphenyl-2-ethyl-carboxy-5 - n - hexyl - cyclohexenone-3-Δ4,5.

For brevity this mixture is identified as No. 312.

The reaction has been carried out at various temperatures from about 0° C. to nearly 100° C. in various solvents, such as absolute ethyl alcohol, methyl alcohol, isopropyl alcohol and n-butyl alcohol, with or without benzol added, and also in benzol at temperatures above 70° C.

The above-described product No. 312 has been made in absolute ethyl alcohol, 95% ethyl alcohol, 99% methyl alcohol, or isopropyl alcohol, by dissolving the caustic soda in the alcohol, cooling to between 0° C. and 20° C., then adding the ethyl acetoacetate or methyl acetoacetate, cooling again as above and then adding the 3,4 methylene dioxy-styryl-hexylketone dissolved in benzol, the addition being done gradually or in portions. The caustic soda may be added in solid form to the combined materials if desired.

The reaction mixture is allowed to stand for a suitable period of time, such as overnight for example, and the resulting reacted solution then is added to water and the mixture is allowed to stand until the benzol solution of the product has separated. The aqueous portion of the mixture yielded additional amounts on acidification. The product was recovered by distilling off the benzol at reduced pressure and at temperatures up to 98° C., and sometimes subsequently to 150° C. The reaction mixture can be mixed with water and acidified directly, carbon dioxide being evolved on acidification.

The product recovered by distilling off the benzol is used as such without further treatment.

A further process is to dissolve sodium hydroxide in methanol, with subsequent cooling. Ethyl acetoacetate was then added, and the mixture cooled again. A solution of 3,4 methylene-dioxy-styryl-hexyl ketone in benzol then was added gradually with constant stirring. The temperature was then raised to 60° C. and kept there for about four hours. The product was cooled and added to water, or poured into a mixture of ice and water, and then acidified. The product was separated in benzol solution and recovered by distilling off the benzol.

A still further modification of the process has been employed, in which the ethyl acetoacetate and 3,4 methylene-dioxy-styryl-hexyl ketone are dissolved in benzol and the solution heated. At about 65° C., one-fourth of the total solid sodium hydroxide in chipped or powdered form was added. The sodium hydroxide dissolved rapidly, heating the solution to violet boiling, water being boiled out. At intervals, the rest of the solid sodium hydroxide was added in three portions, and boiling was continued, until no more water was boiled out by the benzol.

The benzol solution was cooled and water was added; the mixture was acidified to slight excess acid, and the benzol solution of the product was separated. The product was obtained by distilling off the benzol at reduced pressure.

The benzol solution of the reaction product also may be mixed with water, the benzol solution of the product separating. The aqueous solution may then be acidified to recover additional product.

A modification of the last method was to dissolve the ethyl acetoacetate and 3,4 methylene dioxy-styryl-hexyl ketone in benzol. The dissolving of the latter compound reduced the temperature from room temperature, for example, about 25° C. to about 10° C. Then, one-fourth of the solid sodium hydroxide was added and with vigorous stirring some of it dissolved, the solution becoming thick, the temperature rising to about 24° C. The mixture then was heated to boiling, and at intervals the remainder of the solid sodium hydroxide was added. The product was recovered as above.

A still further method includes dissolving ethyl acetoacetate and 3,4 methylene-dioxy-styryl-hexyl ketone in normal butyl alcohol and benzol. This was brought to boiling at substantially 99° C. and one-fourth of the solid sodium hydroxide was added, the addition of the caustic soda producing a violent reaction. At intervals, the rest of the solid sodium hydroxide was added in three equal portions during two hours.

The resulting solution was boiled for nearly twenty-four hours, the boiling effecting removal of water by the boiling benzol, the resulting benzol-water vapors being condensed with removal of the water from the benzol, the latter being returned for continuous operations. The product was recovered as described above by adding water and acid to slight acid reaction. The product was dissolved in benzol and normal butyl alcohol. The solvents were distilled off at reduced pressure for the recovery of the product.

Another modification of the process makes use of a quaternary ammonium compound as the condensing agent, e. g., trimethyl benzyl ammonium hydroxide, as illustrated by the following example:

In a vessel was put 78 parts of ethyl acetoacetate and 200 parts of benzol which was brought to boiling and 8.34 parts of a 38% solution of trimethyl benzyl ammonium hydroxide was added gradually and water boiled out. The solution was cooled somewhat and 97.5 parts of 3,4 methylene-dioxy-styryl-hexyl ketone (No. 267) was added and dissolved. The solution was allowed to cool and stand five hours and remained clear. The solution was boiled at 83–85° C. for one hour and 17 minutes with removal of water. Then 32.5 parts of 3,4 methylene-dioxy-styryl-hexyl ketone was added and the solution was boiled for about 3½ hours with removal of water. The benzol was then distilled off at reduced pressure and the crude product steam distilled for one hour. The product was recovered by benzol which was removed by distillation and heated at reduced pressure.

The reaction between ethyl acetoacetate and 3,4 methylene-dioxy-styryl-hexyl ketone apparently proceeds as follows:

The compound 3,4 methylene-dioxy-styryl-hexyl ketone reacts with ethyl acetoacetate to form an addition product in which the ethyl acetoacetate adds to the double bond of the 3,4 methylene-dioxy-styryl-hexyl-ketone. This addition product cyclicizes to the above-mentioned mixture of 1-3,4 methylene-dioxy-phenyl-5-n-hexyl-cyclohexenone-3-Δ4,5 and 1-3,4 methylene-dioxy - phenyl - 2 - ethyl - carboxy - 5 - n-hexyl-cyclohexenone-3-Δ4,5.

These reactions may be represented as follows:

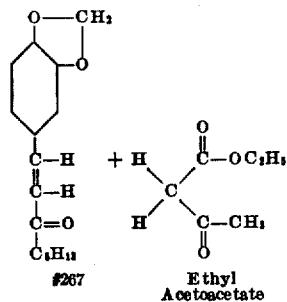

In presence of catalyst

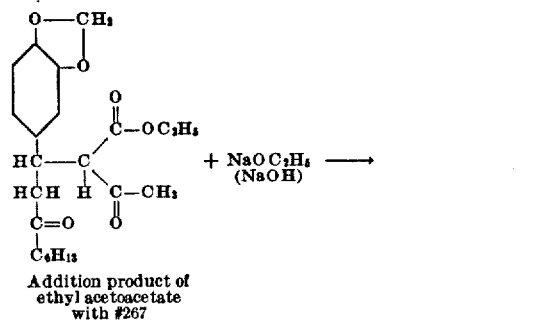

Addition product of ethyl acetoacetate with #267

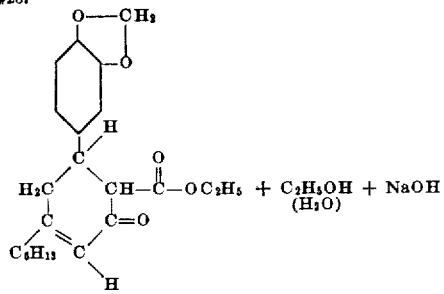

Ester form of 312 1-3,4 methylene dioxyl phenyl 2-ethyl carboxy-5-n-hexyl cyclohexenone-3-Δ 4,5

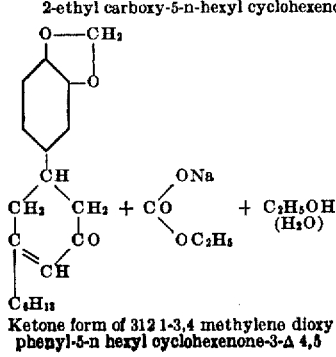

Ketone form of 312 1-3,4 methylene dioxy phenyl-5-n hexyl cyclohexenone-3-Δ 4,5

For practical purposes the ester form and the ketone form above illustrated do not need to be separated but are advantageously used as a mixture. The proportions of ester form and ketone form can be varied, but both forms are effective.

Example II

When methyl acetoacetate is used instead of ethyl acetoacetate for reaction with 3,4 methylene-dioxy-styrylhexyl ketone (piperonal-methyl-hexyl-ketone), there is formed a mixture of the ester form and of the cyclic ketone form similar to that formed in Example I, and which is identified for convenience as No. 339. The ester form and the ketone form are, respectively, the 1-3,4 methylene-dioxy-phenyl-methyl carboxy - 5 - n - hexyl-cyclohexenone-3-Δ4,5 and 1-3,4 methylene-dioxy-phenyl-5-n-hexyl-cyclohexenone-3-Δ4,5.

Example III

When acetyl acetone is used instead of ethyl acetoacetate for reaction with the 3,4 methylene-dioxy - styrylhexyl ketone, (piperonal-methyl-hexyl-ketone), a cyclic ketone is formed with an acetyl group which may be considered to have the following formula:

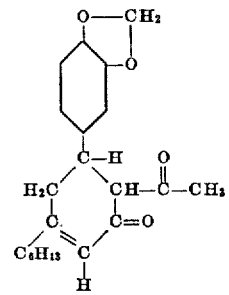

Example IV

Piperonal is reacted with methyl isobutyl ketone instead of with methyl hexyl ketone to form the 3,4 methylene dioxy-styryl isobutyl ketone

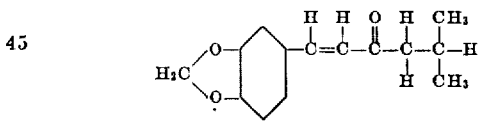

and this is in turn reacted with ethyl acetoacetate in the presence of an absolute alcohol solution of sodium alcoholate resulting in a condensation product which is a mixture and which is identified for convenience as No. 332, and which may be considered to be a mixture of the following compounds: 1 - 3,4 methylenedioxyphenyl - 2 - ethyl carboxy - 5 - isobutyl-cyclohexenone-3-Δ4,5 and 1-3,4 methylenedioxyphenyl - 5 - isobutyl - cyclohexenone-3-Δ4,5.

Example V

As a further illustration the compound 3,4 methylene dioxystyryl amyl ketone (No. 268)

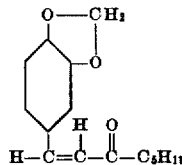

condenses in a similar manner with ethyl acetoacetate in the presence of an absolute alcohol solution of sodium alcoholate to produce a mixture of 1-3,4 methylenedioxyphenyl-2-ethyl carboxy-5-amyl-cyclohexenone - 3 - Δ4,5 and 1 - 3,4 methylenedioxyphenyl-5-amyl-cyclohexenone-3-

Δ4,5. This mixture may be referred to as No. 333.

In a similar manner other compounds can be made by condensing or reacting piperonal with other ketones such as methyl ethyl ketone, methyl propyl ketone, methyl butyl ketone, methyl nonyl ketone, methyl undecyl ketone, methyl octenyl ketone, etc., to form ketonic derivatives of piperonal and by reacting the resulting ketonic compounds with ethyl acetoacetate or methyl acetoacetate to form new piperonal cyclohexenones having an alkyl substituent on the cyclohexenone ring, and such compounds may also be formed as mixtures of the ester form and ketone form of the product.

The ester form and the ketone form can be separated from each other, but in general this is not necessary.

The production of a higher homologue having an octyl group on the cyclohexenone ring is illustrated by the following example:

Example VI

Piperonal and methyl octenyl ketone are reacted to produce the piperonal methyl octenyl ketone having the following formula:

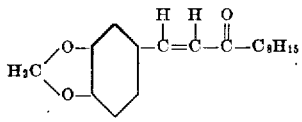

This compound reacts with ethyl acetoacetate to form an addition product, which cyclicizes to yield a mixture of 1-3,4 methylene dioxyphenyl-2-ethyl carboxy-5-octenyl cyclohexenone 3-Δ4,5, and 1-3,4 methylene dioxyphenyl-5-octenyl cyclohexenone 3-Δ4,5.

This mixture of compounds is for convenience indicated as No. 396.

The new piperonal cyclohexenones with an alkyl substituent on the cyclo-hexenone ring are as above indicated valuable insecticides and synergists. They are particularly valuable for use with pyrethrins in making insecticide compositions, enabling small amounts of pyrethrins to be used.

Tests were carried out of the above compounds by the Peet-Grady procedure in comparison with a standard insecticide known as the Official Test Insecticide, hereinafter referred to as the O. T. I., and containing 100 milligrams of pyrethrins per 100 cc. Under standard conditions and using flies of normal resistance, the O. T. I. will give a kill of approximately 50% of the flies in the test.

Utilizing the organic compound identified above, as No. 312, the following series of results displays its effectiveness in combinations of various concentrations of pyrethrins in comparison with the O. T. I. and with other concentrations of pyrethrins. In setting forth these results, it has seemed desirable to quote them in terms of the adjusted kill method, which is generally understood and widely used, and by which the O. T. I. kill is taken at 50 and the various results adjusted to that. In actual practice, in running the tests, the sample under test is compared with the O. T. I. by running a number of different tests with the sample and interspersing with these occasional tests with the O. T. I. Since, however, the kill with the O. T. I. will vary on different lots of flies and from day to day, a better comparison of work extending over a long period is obtained if the results are adjusted, which is done in the following way:

If, for example in a given series of tests the O. T. I. is found to give a kill of 45 and the test sample gives a kill of 75, the adjusted kill is reported by adding 5 to the O. T. I. to bring it up to 50 and an equal amount to the test sample, so that these results would be reported at 50 and 80, rather than as 45 and 75. In a similar way, if the flies are relatively weak so that the O. T. I. gives a kill of 60 and the test sample a kill of 90, the same adjustment is made bringing the relative results to 50 and 80. What slight errors may result in this adjusted kill method are supposed to be more than compensated by relative uniformity of the comparisons. The following results have been obtained.

| Sample | | Per Cent Kill |
|---|---|---|
| A | O. T. I. (100 mg. pyrethrins per 100 cc.) | 50 |
| B | 40 mg. pyrethrins per 100 cc. | 22 |
| C | 175 mg. pyrethrins per 100 cc. | 78 |
| D | One gram Compound No. 312 per cc. | 80 |
| E | One gram Compound No. 312 plus 5 mg. pyrethrins per 100 cc. | 88 |
| F | 500 mg. Compound No. 312 plus 10 mg. pyrethrins per 100 cc. | 86 |
| G | 400 mg. Compound No. 312 plus 15 mg. pyrethrins per 100 cc. | 88 |
| H | 300 mg. Compound No. 312 plus 30 mg. pyrethrins per 100 cc. | 90 |
| I | 300 mg. Compound No. 312 plus 20 mg. pyrethrins per 100 cc. | 85 |
| J | 200 mg. Compound No. 312 plus 20 mg. pyrethrins per 100 cc. | 7 |
| K | 150 mg. Compound No. 312 plus 15 mg. pyrethrins per 100 cc. | 65 |

The foregoing results clearly demonstrate several points:

First, that in insecticides of this type, the incorporation of Compound No. 312, as a synergist permits the reduction of the pyrethrin content almost to the vanishing point with no sacrifice of efficiency as is evidenced by the fact that several of the above combinations containing varying proportions of Compound No. 312 and a pyrethrin content of as low as 5 mg. gave results not only comparable with those obtained with the O. T. I., but also with the much stronger pyrethrum insecticide containing 175 mg. of pyrethrins per 100 cc. Second, the results also demonstrate that the proportions in which Compound No. 312 and pyrethrins may be combined, vary within very wide limits and will be controlled by economic considerations and personal opinions rather than by limitations inherent in the chemical itself.

In a completely different type of insecticidal preparation for the control of body lice, a series of experiments was made with impregnated powders containing varying proportions of Compound No. 312, both without and with pyrethrins, with the following results:

| Concentration | Per Cent Survives 24 hours |
|---|---|
| 5% Compound No. 312 | 28 |
| 2% Compound No. 312 | 20 |
| 1% Compound No. 312 | 48 |
| 0.5% Compound No. 312 | 64 |
| 0.5% Compound No. 312 plus 0.01% pyrethrins | 0 |
| 0.25% Compound No. 312 plus 0.005% pyrethrins | 27 |
| 0.025% Compound No. 312 plus 0.005% pyrethrins | 56 |

This series of tests is particularly illuminating in its comparison with the results obtained where 0.5% Compound No. 312 used alone gave 64% survival, whereas 0.5% used with the addition of as little as 0.01% pyrethrins gave no survivors at all.

Another method of using insecticide materials is in solution in liquified "Freon" gas (fluo-chlormethane) in a pressure container. When the pressure is released, this releases extremely fine atomized particles which are highly toxic to insects. A comparison was made under control conditions on three formulas, with the following results:

|   |   | Per cent knockdown | | Per Cent Mortality 24 hours |
|---|---|---|---|---|
|   |   | 10 min. | 2 hrs. |   |
| A | 0.4% pyrethrins and 8% cotton seed oil. | 35 | 1 | 2 |
| B | 0.4% pyrethrins plus 8% cotton seed oil plus 2% of Compound No. 312. | 98 | 99 | 68 |
| C | 8% cotton seed oil plus 5% Compound No. 312. | 0 | 0 | 0 |

The comparison of these three tests furnishes additional proof of the synergistic value of the chemical, Compound No. 312, in that the addition of 2% of Compound No. 312 in formula "B" above greatly increased the knockdown and kill as compared with formula "A," whereas in formula "C" the absence of any pyrethrin content whatever caused the results to be zero in this particular test.

In another very important field, namely the control of common agricultural insects, principally those infesting food crops, there was prepared what is known as an impregnated dust base formulated in such a way as to contain impregnated on an inert carrier 2.5% of Compound No. 312, and 0.2% pyrethrins. This dust base was then converted into a finished insecticide by mixing it in various proportions with a completely inert carrier, namely pyrophyllite or talc, in such proportions that the finished insecticides contain from 15 pounds to the hundred of the dust base to 30 pounds per hundred, and for most instances 20 pounds. The finished dust made on the 20-pound basis contained therefore, 0.5% of Compound No. 312 and 0.04% pyrethrins. Under practical conditions this dust was found to be particularly effective against a wide variety of insects including the following:

Bean leafhoppers
Potato leafhoppers, *Empoasca fabae*
Grape leafhoppers, *Erythroneura comes*
Blunt-nosed cranberry leafhoppers
Mexican bean beetles, *Epilachna varivestis*
Cucumber beetles, *Diabrotica duodecimpunctata* and *D. vittata*
Imported green cabbage worm, *Ascia rapae*
Cabbage loopers, *Autographa brassicae*
Diamond-back moth larvae, *Plutella maculipennis*
Harlequin bug, *Murgantia histrionica*

Also, numerous others, although in the case of some of the more resistant and more adult forms of some of these insects it was found desirable to use a higher concentration. The effectiveness of these dusts against the insects in question and at the concentrations used was adequate proof that the dust base referred to above as containing 2.5% of Compound No. 312 and only 0.2% pyrethrins possessed an effectiveness at least equal to similar impregnated dusts made up with pyrethrins as their sole insecticidal constituent and containing 1% pyrethrins.

In many cases, practical control of agricultural insects is more readily obtained with sprays and in the formulation of these sprays what is known as Pyrethrum Extract No. 20 is frequently used commercially: Pryethrum Extract No. 20 means a product containing 2 grams pyrethrins per 100 cc. dissolved in a mineral oil base unless otherwise specified, although occasionally made with alcohol instead of mineral oil. In sprays of this type, there have been substituted very effectively a combination containing 600 mg. of pyrethrins and 6 grams of Compound No. 312 per 100 cc., for a Pryethrum Extract No. 20 in the same proportions and with beneficial results as regards the effectiveness of the finished spray, thereby furnishing another proof of the synergistic value of Compound No. 312 in combination with pyrethrum and its ability to substitute a large proportion of the pyrethrins which would otherwise be required with no loss in effectiveness.

It should be understood in connection with these references to field tests made against agricultural insects that percentage comparisons such as were quoted above in connection with the Peet-Grady tests etc., are difficult and frequently untrustworthy and are less valuable at best than careful observations by competent observers to the effect that a practical commercial degree of control has been obtained.

The compounds of Examples IV and V, indicated as No. 332 and 333 were similarly tested by the Peet-Grady Chamber test, and their effectiveness is indicated by the following table:

| Composition | Knockdown in 10 minutes | Kill after 24 hours |
|---|---|---|
|  | Per cent | Per cent |
| 0.2% No. 332 40 mg. Pyrethrins 1 and 2 per 100 cc. | 92.7 | 88.2 |
| 0.5% No. 332 20 mg. Pyrethrins 1 and 2 per 100 cc. | 95.7 | 91.0 |
| 0.2% No. 333 40 mg. Pyrethrins 1 and 2 per 100 cc. | 90.4 | 88.0 |
| 0.5% No. 333 20 mg. Pyrethrins 1 and 2 per 100 cc. | 89.8 | 87.5 |
| O. T. I. | 90.2 | 62.9 |

The product of Example VI, designated as No. 396, was similarly tested, and gave the following results:

|   | Knockdown in 10 minutes | Kill after 24 hours |
|---|---|---|
|   | Per cent | Per cent |
| 0.3% Compound No. 396 plus 30 mgs. Pyrethrins 1 and 2 per 100 cc. | 89.4 | 85.7 |
| O. T. I. | 92.8 | 38.9 |

The products of the invention, when used in the intended manner, are innocuous to human beings. They are tasteless and substantially odorless. And they neither sting nor irritate the eyes or nose or mucous membranes of the users.

The new products may be prepared for use as insecticides according to various methods of procedure, and the following description is illustrative of the manner of use for insecticidal purposes, the illustrations being for Compound No. 312 described above, but being applicable to other compounds when similarly used.

For a spray, a concentrate may be first prepared by mixing 30 grams of Compound No. 312 and 3 grams of pyrethrins with sufficient suitable solvent to make 100 cc. of a concentrated compound that will be miscible with a diluent such as kerosene or other petroleum distillate as a vehicle.

For use as a spray, the foregoing concentrate is diluted 100 times with the vehicle, or $1/100$ of the foregoing quantities i. e., 0.3 gm. of Compound No. 312, and 30 mgs. of pyrethrins 1 and 2 are incorporated in the petroleum fraction vehicle, i. e., in 100 cc. of kerosene or other petroleum distillate as a vehicle.

As an agricultural dust, a dry concentrate composed of 250 mgs. of pyrethrins and 2.5 gms. of Compound 312 are added to 100 gms. of a finely comminuted dust-like carrier which dust may be talc, pyrophyllite, or walnut shell dust, or the like. This concentrate may be repacked for use with three or four times the above-indicated quantity of dust.

A further concentrated dust composition may be composed of 2.5% of Compound No. 312 and 0.25% of pyrethrins, the balance being a dust-like carrier of the above-indicated types. For use, one part of the foregoing concentrate is diluted with approximately four parts by weight of dust.

As a concentrated composition for an aerosol bomb, there may be employed approximately 20% of Compound No. 312, approximately 4% of pyrethrins contained in a suitable solvent such as for example, cyclohexenone, 4% of a non-volatile oil such as salad oil for modifying particle sizes when sprayed in a room. The foregoing concentrate is diluted for use with "Freon" (fluor-chlor-methane) in the approximate ratio of one part of the concentrated composition to seven parts by weight of fluor-chlor-methane.

There has also been employed successfully a composition composed of 30 gms. of Compound No. 312, and 3.2 gms. of pyrethrins, with a non-volatile oil content as indicated above. This compound also may be diluted with fluor-chlor-methane in the ratio of one part of the compound to seven parts of fluor-chlor-methane (parts by weight).

From the foregoing description it will be seen that the new products are useful and valuable insecticides and synergists, demonstrating a type of synergism not heretofore observed so far as I am aware. Whereas it has been quite customary to speak of previously known synergists as activators or adjutants because of their ability to add something to the killing power of pyrethrins, it appears that the present invention provides a class of synergists which themselves are activated by the presence of unusually small percentages of pyrethrins.

In addition to providing proof of a type of synergism not hitherto observed, so far as I am aware, in which the activity of one of the synergists is very greatly increased by the presence of small and almost minute quantities of the other synergists (in this case pyrethrins), the foregoing examples demonstrate the absence of specificity in the case of their synergistic combinations. While only a limited number of insects have been mentioned specifically, this number and the wide variety of insects represented indicate that these combinations, instead of being specific, are effective generally against insects known to be susceptible to pyrethrum in any form and at any practical concentration. Moreover, these examples demonstate that the relative proportions of these synergistic chemicals and pyrethrins are subject to no limitations other than those imposed by the practical consideration of obtaining best results at the lowest cost. The synergism itself occurs regardless of whether the combination consists essentially of pyrethrins with a minor proportion of the synergistic chemicals, or essentially of the synergistic chemicals with a minor and almost negligible proportion of pyrethrins, and at all points between these two extremes.

While major emphasis has been placed on the synergistic behavior of these new chemical compounds in combination with pyrethrins, similar synergistic combinations in which the pyrethrins have been substituted by nicotine and by rotenone and the other chemical substances related to rotenone have disclosed varying degrees of synergism.

From the foregoing, it will be seen that the present invention provides new organic chemical compositions which possess highly effective insecticidal properties of themselves, as well as showing marked synergistic properties when combined with pyrethrins.

It will also be seen that the present invention provides a new process of making such chemical compounds in which a reaction product of piperonal and a methyl alkyl ketone is further reacted with an aceto acetic ester with cyclization to form an alkyl substituted cyclo hexenone ring joined to the piperonal group.

It can further be seen that the new cyclohexenone products may be either in the ketone form or in the ester form, the ketone form having the general formula

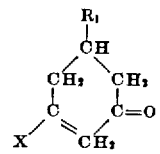

in which $R_1$ is the piperonyl group or radical and X is the alkyl or alkenal group having two or more carbon atoms. Similarly, the ester form of the new compounds have the following general formula:

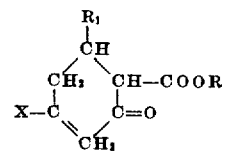

in which $R_1$ and X have the meaning indicated above and R is an alkyl group, e. g. ethyl or methyl.

It will further be seen that mixtures of the ketone form and ester form can be advantageously produced and used without separation.

The alkyl substituent on the cyclo hexenone ring is advantageously a higher alkyl group containing 3 to 5 carbon atoms, but still higher alkyl groups may be present up to 8 or 10 carbon atoms, or more, in the alkyl group.

This application is a continuation-in-part of my prior application Serial No. 520,099, filed January 28, 1944, and which has become abandoned.

Insecticide compositions containing pyrethrin and the compounds of the present invention are covered by my application Serial No. 57,616, filed October 30, 1948.

I claim:

1. The compounds having the generic formula

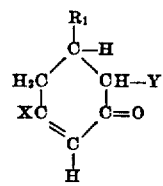

in which $R_1$ is the 3,4-methylenedioxyphenyl radical, X is a substituent selected from the group consisting of alkyl radicals having from two to eleven carbon atoms and octenyl radicals, and Y is a substituent selected from the group consisting of hydrogen and

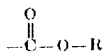

in which R is a substituent selected from the group consisting of alkyl radicals having from one to six carbon atoms, the cyclohexyl radical and the n-butoxyethyl radical.

2. The compounds of claim 1 in which X is the isobutyl radical.

3. The compounds of claim 1 in which X is the n-amyl radical.

4. The compounds of claim 1 in which X is the n-hexyl radical.

5. 1-3,4 - methylenedioxyphenyl - 2 - ethylcarboxy-5-n-hexylcyclohexenone-3-Δ-4,5.

6. The process of making insecticides and synergists which comprises reacting a ketonic compound having the generic formula

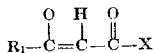

in which $R_1$ is the 3,4-methylenedioxyphenyl radical and X is a substituent selected from the group consisting of alkyl radicals having from two to eleven carbon atoms and octenyl radicals with a compound having the generic formula

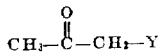

in which Y is a substituent having the generic formula

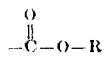

where R is a substituent selected from the group consisting of alkyl radicals having from one to six carbon atoms, the cyclohexyl radical and the n-butoxyethyl radical to form a cyclohexenone substituted with a 3,4-methylenedioxyphenyl radical and with X.

7. The method of claim 6 in which X is the isobutyl radical.

8. The method of claim 6 in which X is the n-amyl radical.

9. The method of claim 6 in which X is the n-hexyl radical.

OSCAR FRED HEDENBURG.

REFERENCES CITED

The following references are of record in the file of this patent:

UNITED STATES PATENTS

| Number | Name | Date |
|---|---|---|
| 2,131,998 | Billig | Oct. 4, 1938 |
| 2,202,145 | Eagleson | May 28, 1940 |
| 2,202,148 | Ginsburg | May 28, 1940 |
| 2,326,350 | Gertler et al. | Aug. 10, 1943 |
| 2,368,071 | Senkus | Jan. 23, 1945 |

OTHER REFERENCES

Contributions; Boyce Thompson Institute, vol. 13 No. 2, April, June 1943, pages 87–92.